United States Patent [19]

Weissenbach et al.

[11] Patent Number: 5,037,164
[45] Date of Patent: Aug. 6, 1991

[54] WORKSTATION ARRANGEMENT FOR LABORATORIES, PRODUCTION FACILITIES AND THE LIKE

[75] Inventors: Albertus Weissenbach, GC Bodegraven, Netherlands; Gerd Schaumann, Friedrichsdorf; Wolfgang H. Wanner, Heusenstamm, both of Fed. Rep. of Germany

[73] Assignee: Zumtobel GmbH & Co., Usingen, Fed. Rep. of Germany

[21] Appl. No.: 36,973

[22] Filed: Apr. 10, 1987

[30] Foreign Application Priority Data

Apr. 18, 1986 [DE] Fed. Rep. of Germany ....... 3613216

[51] Int. Cl.$^5$ .............................................. A47B 77/08
[52] U.S. Cl. .................................................. 312/223
[58] Field of Search ............... 312/223, 209, 196, 201, 312/245; 108/64, 65, 67, 50; 361/428, 429

[56] References Cited

U.S. PATENT DOCUMENTS

| | | | |
|---|---|---|---|
| 2,166,704 | 7/1939 | Foulkes | 312/201 X |
| 2,860,404 | 11/1958 | Alden | 312/223 X |
| 4,042,287 | 8/1977 | Hallen | 312/209 |
| 4,544,214 | 10/1985 | Nizel et al. | 312/209 |
| 4,586,759 | 5/1986 | Wrobel | 312/209 X |
| 4,632,469 | 12/1986 | Lampman | 312/245 X |
| 4,637,666 | 1/1987 | Worrell et al. | 312/196 |
| 4,639,049 | 1/1987 | Frascaroli et al. | 108/64 X |
| 4,646,211 | 2/1987 | Gallant et al. | 312/223 |

FOREIGN PATENT DOCUMENTS 58819 4/1985 European Pat. Off. .
1690171 4/1973 Fed. Rep. of Germany .

Primary Examiner—Joseph Falk
Attorney, Agent, or Firm—H. Gibner Lehmann; K. Gibner Lehmann

[57] ABSTRACT

Arrangements for forming working areas or workstations equipped with supply connections for power, gaseous and/or liquid media, communication connections and monitoring connections and the like, in laboratories, production locations and the like, wherein all supply means are combined in fixedly mounted connecting devices while the actual working surfaces are formed by selectable working and standing position elements that can be freely set up and grouped as desired, with respect to the connecting devices. The position elements are free of any connections. Discharge or removal of the media is also effected by way of a system which is laid out in accordance with a predetermined pattern. Additional removal or discharge elements may be arranged in a row with the working and standing position elements or alternately the removal or discharge devices may be incorporated into the connecting devices.

4 Claims, 9 Drawing Sheets

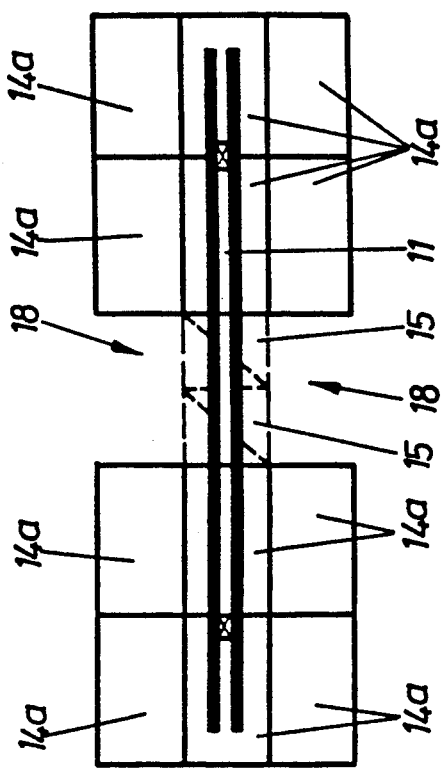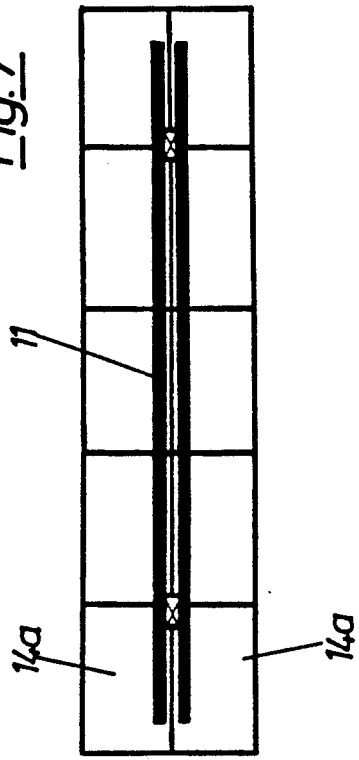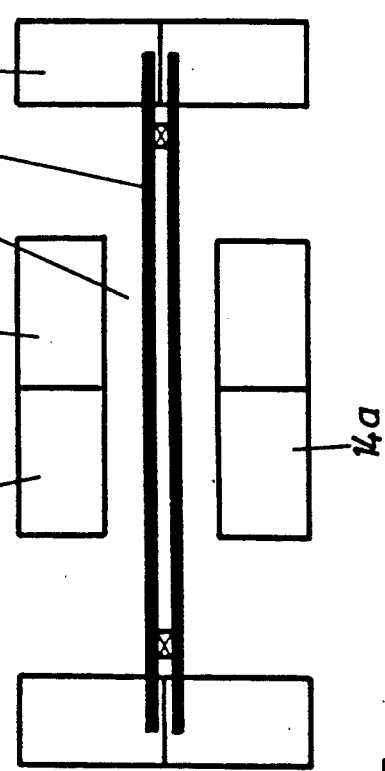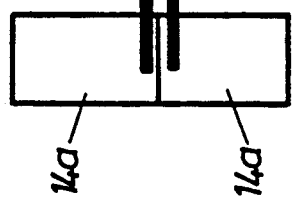

WORKSTATION ARRANGEMENT FOR LABORATORIES, PRODUCTION FACILITIES AND THE LIKE

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to arrangements for forming working positions or working areas which are equipped with supply connections for power, gaseous and/or liquid media, and for communications, monitoring and the like, in laboratories, production locations, testing and research areas, and wherein there are provided on the one hand, table-like, stand-like and/or cupboard-like working and standing position elements, and on the other hand connecting devices which are spatially associated with the working and standing position elements but which are mounted separately therefrom, for the supply of power, gaseous and/or liquid media, and for communications, monitoring and the like.

2. Description of the Related Art Including Information Disclosed Under 37 CFR §§1.97-1.99

German Patent specification No. 1 690 171 discloses rail-like combined connecting devices for supplying terminal or take-off points in hospitals, laboratories and the like, with electrical power, gases and liquids, and which can be adapted in respect of their length, configuration and arrangement to the particular requirements of space and position, for example the spacings between beds, the dimensions of the laboratory benches and the like. Column-like connecting devices for various supply and discharge systems for corresponding use in hospitals, laboratories and the like are disclosed in European patent specification No. 58819. However, those known rail-like and column-like combined connecting devices suffer from the disadvantage that they can only be designed for a limited number of supply and discharge systems. Therefore, in regard to use in laboratories, production locations, test areas and research areas, they only represent a supplement to the laboratory benches and the like which are themselves fitted with supply and discharge systems. In particular, the known combined connecting devices are not suitable for procedures involving a high level of purity (gas and liquids), for compressed gas procedures, and for measuring and filtering operations, or they cannot be easily adapted for such use. In addition, the known combined connecting devices, such as for existing laboratory benches fitted with supply and discharge systems, lack safety in that there is the risk of explosion due to an accumulation of explosive gas-air mixtures within the cavities formed in the known connecting devices and associated laboratory benches.

In laboratories, changes in the tasks to be performed frequently occur, which make it necessary to alter the supply and discharge systems, for example alterations in the delivery of and controlled removal of other kinds of gases. In addition, changes in the tasks to be performed or alterations in the development or investigation task involved require modification of the form and the size of the working surfaces and standing surfaces required. Such modifications generally cannot be readily achieved with the known laboratory benches which carry and guide supply and discharge systems.

SUMMARY OF THE INVENTION

The above disadvantages and drawbacks of prior workstation arrangements are largely obviated by the present invention, which has for one object the provision of a novel and improved workstation which is both simple in construction, and is characterized by a high degree of flexibility and adaptability to different types of installations, having widely varying configurations.

A related object of the invention is to provide an improved workstation as above set forth, wherein essentially all of the electrical supply and control circuitry, and pressure fluid media lines and connections associated therewith are isolated, and confined to a rail-like connecting device in the form òf a conduit, such that there are minimized potential hazards normally associated with such electrical circuitry and with flammable or explosive gases.

Still another object of the invention is to provide an improved workstation of the kind indicated, wherein workbenches or work tables are, for the most part, completely separate from the rail-like connecting devices, thereby enabling such benches to be readily shifted or re-positioned, to suit varying space and functional requirements.

The above objects are accomplished by an arrangement for forming working positions equipped with supplies for power, fluid media, communications, monitoring and the like, adapted for use in laboratories, production locations, testing and research areas wherein there are provided on the one hand workbench elements and on the other hand connecting devices which are spatially associated with the workbench elements but which are mounted separately therefrom, for the supply of power, fluid media, communications, monitoring and the like, comprising conduit means having a determinate structural configuration, elongate supply devices for carrying electrical energy and for transporting fluid media, and for providing communications or monitoring, carried in the conduit means, and a plurality of workbench elements which are disposed adjacent to, and which are free of the elongate supply devices. The conduit means and the elongate supply devices that are provided therein for power, fluid media, communications and monitoring, are capable of various configurations applicable to the particular laboratory, production, test or research task. The conduit means is fixedly mounted in a working area in accordance with a predetermined pattern, and the work bench elements are capable of being independently freely set up and grouped in a desired manner and pattern with respect to selected portions of the conduit means, to thus form working station which is useful in connection with the said task.

The problem solved by the invention is to provide arrangements for forming working positions or working areas which are equipped with supply connections and in regard to which there is a high degree of flexibility both in respect of the available supply connections for power, gaseous and/or liquid media, and for communications, monitoring and the like, and also in regard to the working and standing surfaces to be provided. At the same time the invention provides improvements in safety and visibility at the working position or working area.

More particularly, the problem solved by the invention is the following:

1. All supply devices and supply connections for power, gaseous and/or liquid media, communications, monitoring, etc. are combined in the connecting devices while the working and standing position elements are free of supply means and supply connections.

2. The connection devices are of a variable configuration with respect to the supply means and supply connections provided, as regards power, gaseous and/or liquid media, communications, and monitoring, etc., for ease of adaptation to the respective working, investigation, development or research task.

3. The connecting devices are fixedly mounted in a working space or working area in accordance with a predetermined pattern while the working and standing position elements can be freely set up or grouped in a predetermined, desired manner and number in the vicinity of a selected part or region of the connecting device, to form a working and standing position which is suited to the respective working, investigation, development or research task.

The invention does not just permit flexible adaptability of the respective working and standing position to the respective work to be carried out thereat, but it also provides optimum adaptation of the working and standing position to be formed, to lighting conditions prevailing in the respective working area or space. If lighting conditions which already exist in the working space or area are found to be inadequate for the intended purposes, the arrangement of the invention provides improved lighting conditions by means of lamps which can be mounted on the connecting devices in a known manner or which can be integrated into the connecting devices (see German Patent specification No. 1 690 171). The fact that all supply systems are combined together in the combined connecting device means that it is possible to achieve substantial improvements in safety, in a simple but highly effective manner. For example, a suction extractor means provides for constant venting of the spaces within the connecting device thereby preventing the formation and accumulation of explosive gas-air mixtures, toxic and/or corrosive vapors, and the like. As the working and standing position elements provided in accordance with the invention, unlike conventional laboratory furniture, are kept entirely free of supply and discharge systems, there is also no longer any danger of hazardous media being formed in or accumulating in cavities in such working and standing position elements.

In accordance with the invention, the necessary supply means and the connections thereof, in particular the discharge means for gaseous and/or liquid media, may be fixedly mounted in a similar manner to the connecting means for the supply, and in a fixed pattern in the working position or working area. In that case, the working and standing position elements are freely set up or grouped at the same time, both in regard to the selected part or region of the connection devices and also in regard to the selected part or region of the removal means.

In one embodiment of the invention, the removal means may be combined with the connecting devices for supply purposes. In that arrangement, on the one hand the supply means and the connections thereof, and on the other hand the removal means and the connections thereof, may be arranged in two separate planes, and the working and standing position elements may be freely set up or grouped as desired in regard to those two planes. An arrangement which is to be considered in that respect is one in which there are provided a supply plane above the working and standing surface defined by the working and standing position elements, and a removal plane disposed substantially in or below the working and standing surface.

In a particularly advantageous embodiment of the invention, the connecting devices include column-like connecting portions which, in their upper parts, include supply means with installation connections in the upper endregions of the column and which contain in their lower parts, removal means with installation connections in the lower end regions of the column.

Furthermore, by the invention the connecting devices can include substantially horizontally extending rail-like connecting portions along which the working and standing position elements can be freely set up or grouped. In that arrangement, the working and standing position elements may additionally have members which are displaceable along substantially horizontal guides, wherein the guides of said displaceable members may be oriented and/or mounted in substantially parallel relationship to the rail-like connecting portions. For example, carriages and the like can be located on substantially horizontal guides, and movable on rollers. By such an arrangement, measuring and diagnostic or test equipment may be moved along an established working and standing position to a desired location and, after having been used, may be removed again from the area of the working and standing position. In the embodiment of the invention in which there are provided horizontally extending rail-like connecting portions, it is particularly advantageous for additional working lamps to be disposed in or on the rail-like connecting portions in spaced relation.

BRIEF DESCRIPTION OF THE DRAWINGS

Embodiments of the invention are described in greater detail hereinafter reference to the accompanying drawings in which:

FIG. 4 illustrates a still further modified distribution layout, having workbenches arranged in four "islands", each island containing two workbenches.

FIG. 5 illustrates still another type of distribution layout, having "islands" formed by multiple workbenches.

FIG. 6 shows yet another type of distribution layout, this also comprising islands formed by multiple workbenches.

FIG. 7 shows a further modification, wherein the workbenches are arranged in line with and below a single rail-like connecting device.

DESCRIPTION OF THE PREFERRED EMBODIMENTS

Figure 12:
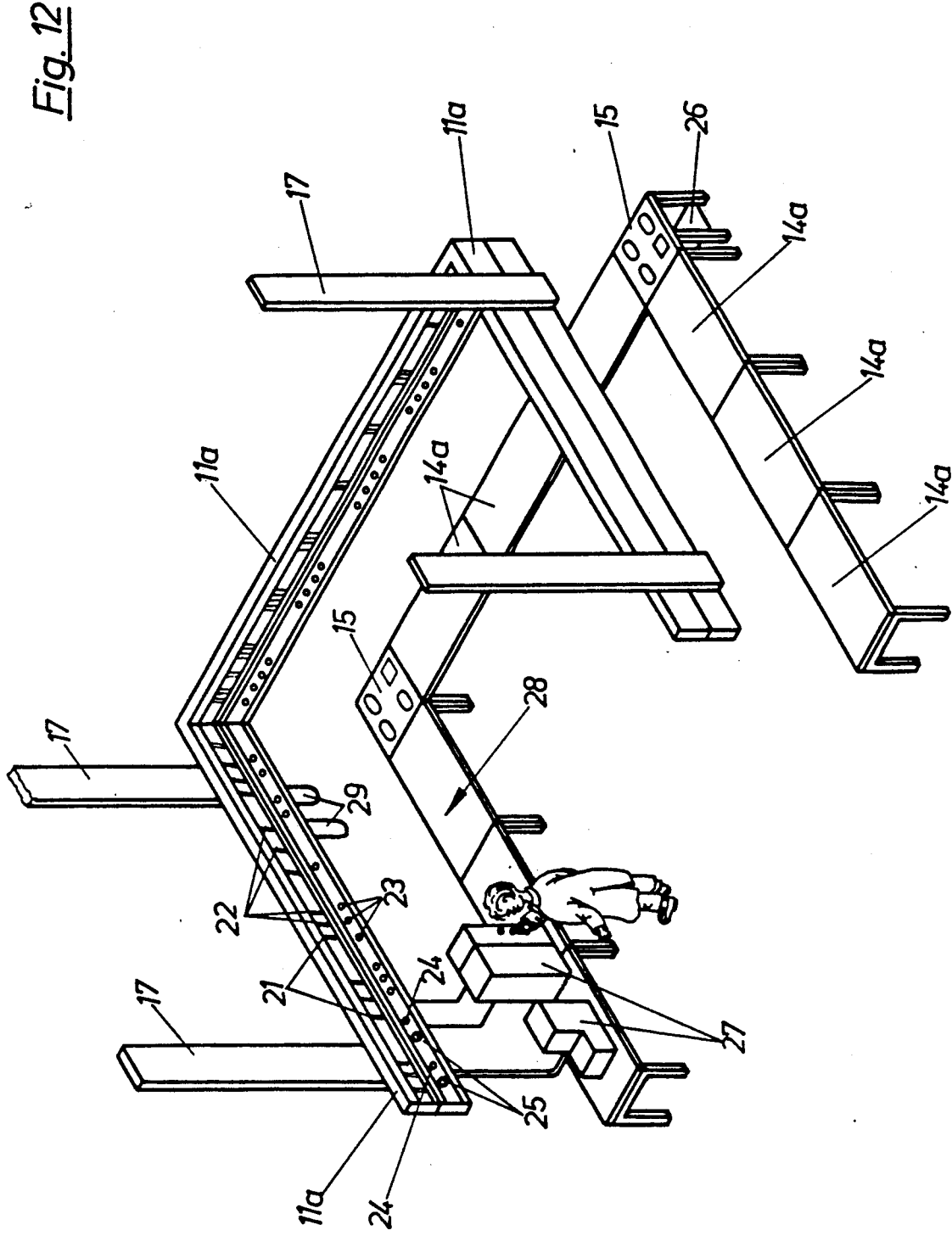
FIG. 12 is a perspective view of an example of a group of workbenches and rail-like connecting devices arranged in a horseshoe or U-shaped configuration.

Referring first to FIG. 12 and in accordance with the present invention there is provided a novel and improved workstation facility for use in laboratories, production lines, testing and research areas, and the like, comprising substantially horizontally extending rail-like connecting devices 11a which are fixedly mounted in a pendent or suspended fashion, as for example, being suspended from the ceiling of a room, the rail-like connecting devices 11a containing conduits carrying electrical power, communication lines and/or monitoring system lines, control and measuring system lines and the like. The rail-like connecting devices 11a also include conduits for gaseous and liquid media, hereinafter also referred to as fluid media. In addition, connecting elements belonging to various ones of the above systems are mounted on the rail-like connecting devices 11a. Further by the invention, there are provided working and standing position elements 14 such as workbenches, that are intended to be freely set up and grouped beneath the rail-like connecting devices 11a, and underneath the paths of movement of carriages 13, in accordance with a particular choice and requirement of a given installation.

Referring now to FIG. 12, three rail-like connecting devices 11a are connected together to define a "U-arrangement" and are fixedly mounted in the horizontal position by means of carriers 17, more specifically hanging-type suspension carriers, suspended from the ceiling (not shown) of a room. The connecting devices 11a have connecting elements 21, for example plugs and sockets for the supply of electrical energy, electrical connecting elements or devices 22 for low-voltage current systems such as communications systems, monitoring systems, control systems and the like, connecting devices 23 for the supply of fluid media and for selective pressure-regulated supply of fluid media of the last-mentioned devices, the figure shows operating knobs 24 and pressure indicating instruments 25. Elements 21, 22 and 23 constitute supply devices Removal or discharge connections are installed in the floor of the working area beneath the corner regions of the "U arrangement" of the connecting devices 11a. In that connection FIG. 12 shows the cover plate 26 on the floor.

For the purposes of making up the "U-arrangement" of rail-like connecting devices 11a, this embodiment has a "U-configuration" of laboratory benches or tables 14a, wherein respective discharge or removal elements 15 are arranged in the corner regions of the U-configuration The elements 15 contain removal or discharge devices such as suction discharge pumps, drains for liquids and the like, said discharge or removal devices being connected to the discharge connections that are installed in the floor.

As FIG. 12 shows, the laboratory benches 14a of the "U-configuration" may be used for setting up pieces or items of equipment 27, with an area of working surface 28 preferably being kept free. If additional pieces or items of equipment 27 are required, it is also possible to provide additional racks or stands 14b (see FIG. 3) and/or carriages 13 which are movable along the rail-like connecting devices 11a (see FIG. 1).

Referring again to FIG. 12, in order to make it possible to operate with gases or liquids of high purity, the rail-like connecting devices 11a are provided with connecting means for filters 29, at least at a part of the conduits which are carried in the connecting devices. Moreover, the rail-like connecting devices 11a are of such a design and configuration that, in regard to the electrical lines and cOnduits disposed therein, they can be easily adapted, with minor modifications, to the particular requirements dictated by the operations to be performed.

Figure 13:
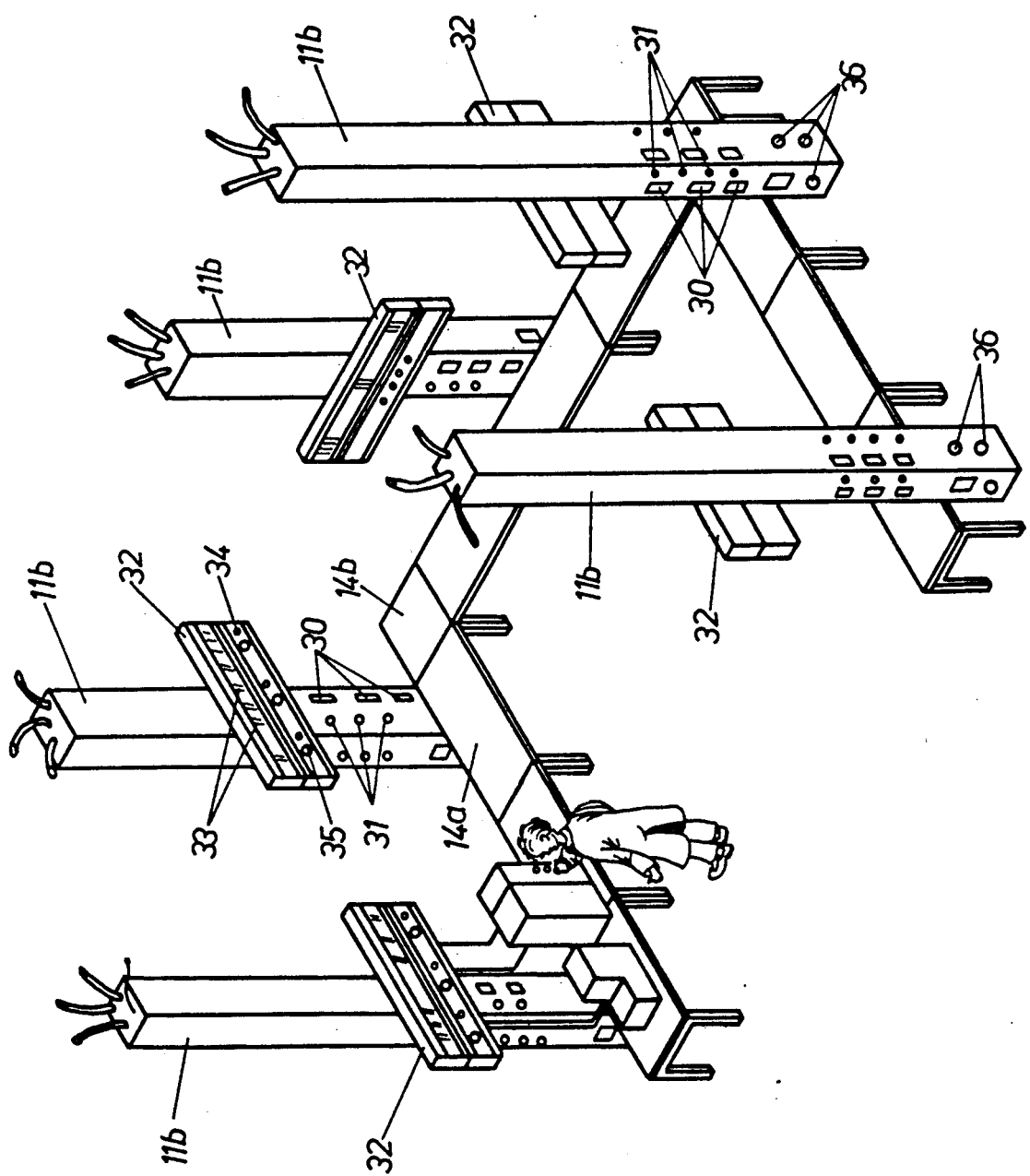
FIG. 13 is a perspective view of an example of a group of workbenches and rail-like connecting devices also disposed in a horseshoe or U-shaped configuration, except that the rail-like connecting devices are somewhat modified.

In the embodiment shown in FIG. 13, the workstation facility has five upstanding column-like connecting devices 11b which in their respective upper portions contain the conduits and electrical lines required for the provision of power, communications, control means, gaseous and liquid media. At the upper end of the connecting devices 11b the above-mentioned conduits and electrical lines are connected in the region of the ceiling of the room or an intermediate or false ceiling, to the corresponding installation components of the building. Groups of connecting elements 30 for electrical connections such as the supply of power, control lines and the like are provided on each connecting device 11b above the working and standing surface formed by laboratory tables or benches 14a. Furthermore, there are groups of connections 31 for the provision of gaseous and liquid media. In the embodiment of FIG. 13, each connecting device 11b carries a transverse rail or bar 32 spaced from the floor of the working area which approximately corresponds to the height of a man, and above the working surface. Arranged on the transverse member 32 are further electrical connecting elements 33, adjusting devices 34, and indicator devices 35 associated with pressurized fluid media, such as gaseous and liquid media to be supplied.

The connecting devices 11b extend to the floor of the working area. In its lower portion each connecting device 11b contains discharge or removal devices and removal or discharge connections 36. In the interior of the respective connecting device 11b these lead to discharge or removal installations that are laid in the floor.

The laboratory tables or benches 14a and the rack or stand elements 14b are freely set up and grouped in a horseshoe arrangement or a "U-configuration" between the connecting devices 11b. The connecting rail members 32 may preferably be fitted selectively to any one of the four sides of each column-like connecting device, and can therefore be moved from the mounting configuration shown in FIG. 13, to one side or the other of each column-like connecting device 11b. The groups of electrical connections 30 and connections 31 for gaseous and liquid media may be arranged on all sides of the column-like connecting devices 11b.

Figure 14:
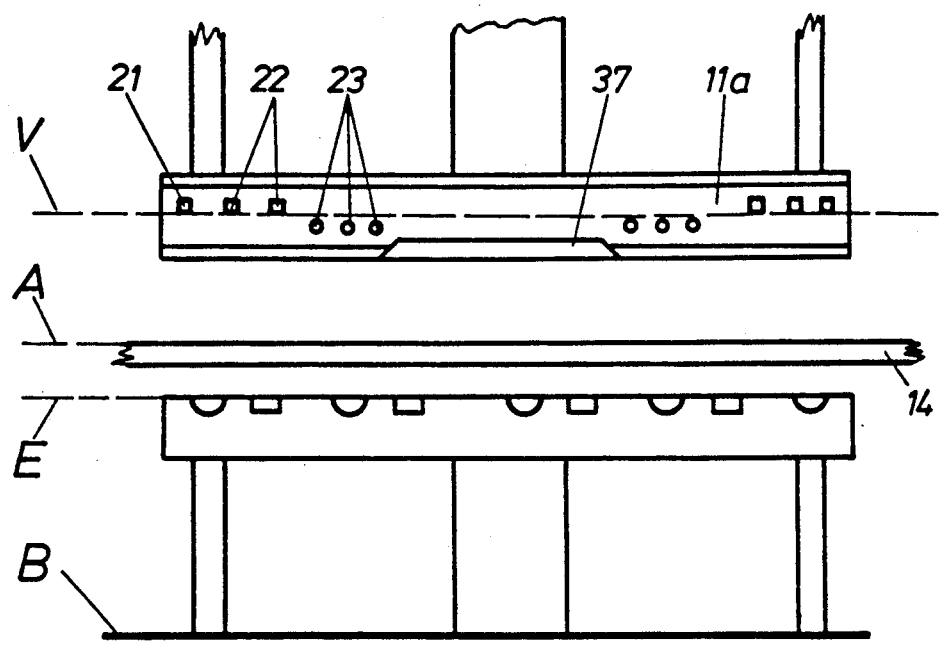
FIG. 14 is a fragmentary view of the arrangement shown in FIG. 12, illustrating the locations of planes that contain certain elements of the workstation.

FIG. 14 is a fragmentary diagrammatic view of the workstation facility of FIG. 12, and which incorporates horizontally mounted rail-like connecting devices 11a with electrical connections 21 and 22, connections 23 for gaseous and liquid media, and a working position lamp 37 carried by the rail-like connecting device 11a, as an element for providing suitable lighting of the working position. Elements 21, 22 and 23, as well as lamp floor B. A group of such elements forms a supply plane V which is disposed at a spacing above the working plane A defined by the partially set-up working and standing position elements 14. Formed in the working plane A or beneath same, as shown in FIG. 14, is a removal or discharge plane E from which removal or discharge occurs. Those removal or discharge devices, for example suction removal devices and the like, which extend over the working plane A in the region of the working position, are connected into the system in the plane E.

Figure 15:
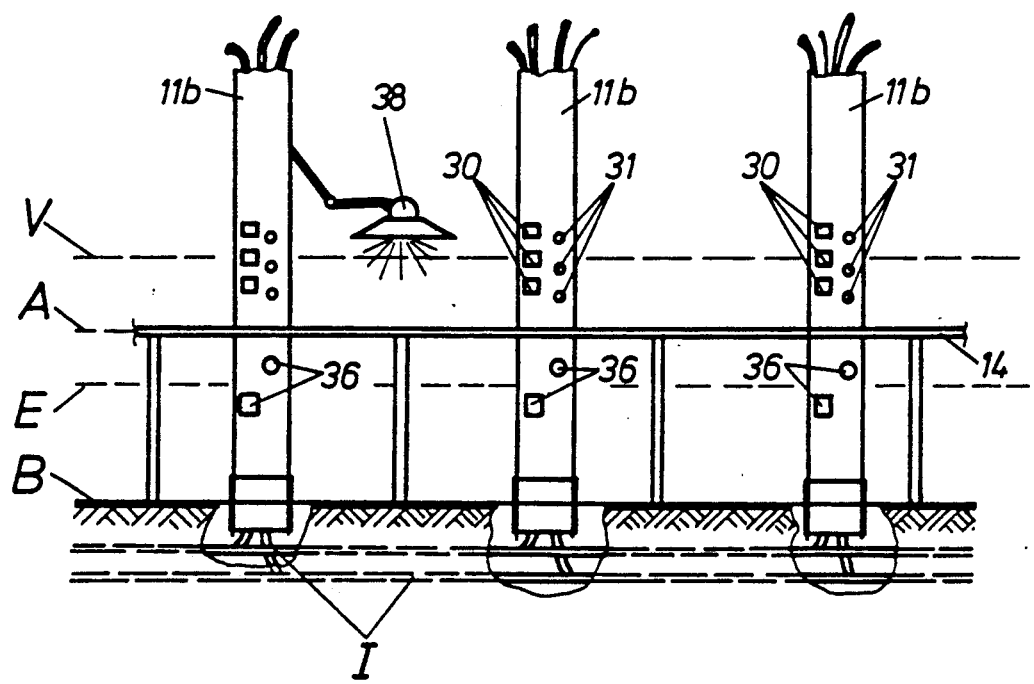
FIG. 15 is a fragmentary view similar to that of FIG. 14, of a modified workstation having connecting devices of a column-like nature, and which are equipped with both supply means and removal means.

FIG. 15 is a fragmentary diagrammatic view of another embodiment, in which column-like connecting devices 11b are provided in a fixed assembly in the working area. The electrical connecting devices 30 and the connections 31 for the provision of gaseous and liquid media are arranged in a supply plane V above the working plane A formed by the working and standing position elements 14. A removal or discharge plane E is formed beneath the working plane A, with the connections 36 to the removal or discharge units disposed in the lower portion of the column-like connecting devices 11b. In this case also, removal or discharge devices which join the connections 36 may extend upwardly above the working plane A at the working position. From the connections 36, the removal or discharge devices disposed in the lower portion of the column-like connecting devices 11b extend into the floor B, to removal or discharge installations I laid therein. That is of particular advantage where the vertically disposed connecting devices 11b rest on the floor B and are anchored therein. As FIG. 15 shows, the vertically extending connecting devices 11b may also be fitted with a lamp 38 for illumination of the working positions, in the region of the plane V, with the position of the lamp 38 being adjustable.

Figure 1:
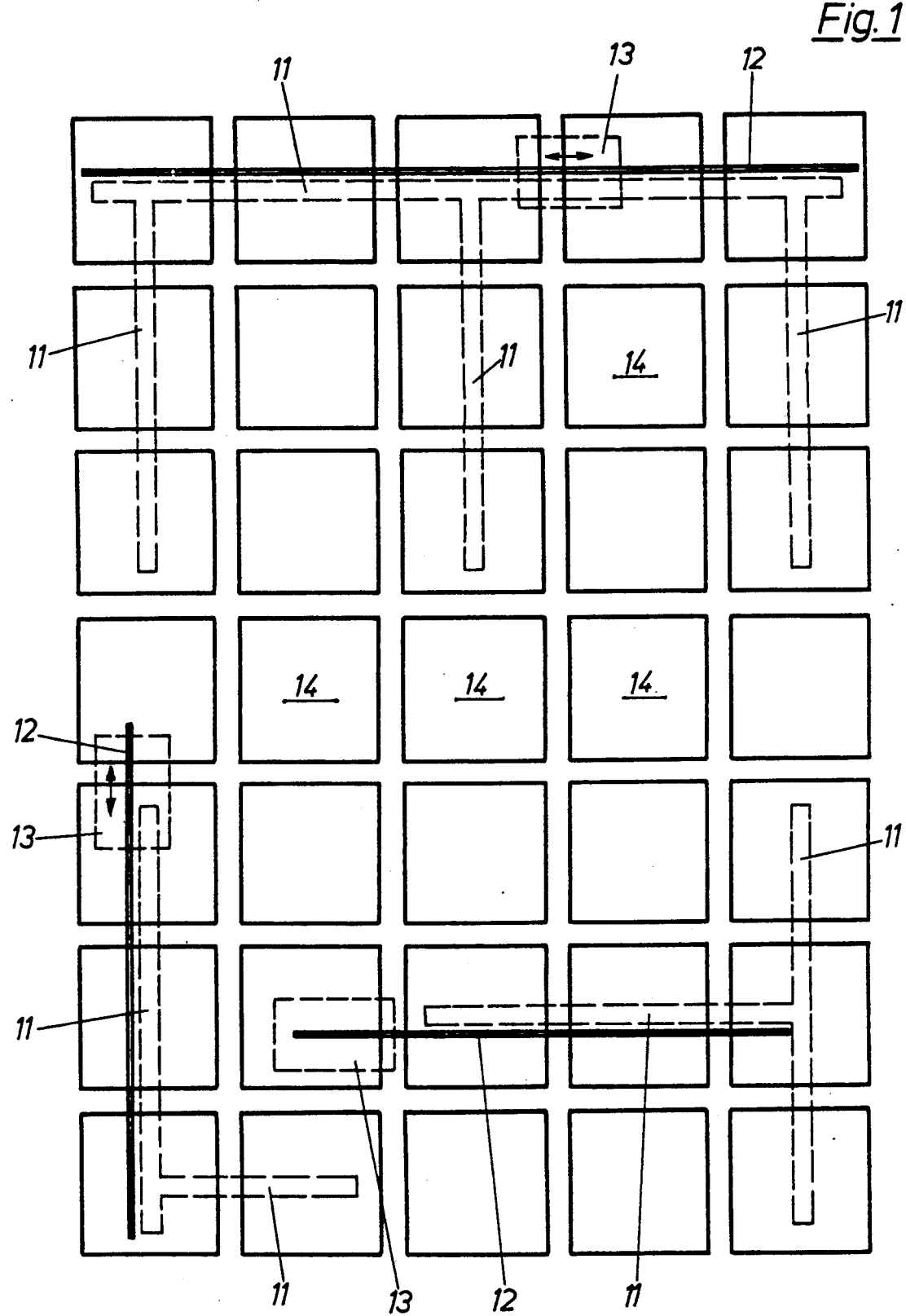
FIG. 1 is a plan view of a module distribution layout for a working area or workstation constructed in accordance with the invention, illustrating both a "comb-like" and a "T-shaped" arrangement of rail-like connecting devices, and further illustrating relative positions of a number of workbenches disposed beneath the rail like connecting devices.

FIG. 1 illustrates a top plan view of a facility having workbenches or work stations of the type shown in FIG. 12, in which there are substantially horizontally extending rail-like connecting devices 11 that are fixedly mounted, being suspended from the ceiling (not shown) of the room. The connecting device 11 contain the conduits for carrying electrical power, for communication systems and monitoring systems, and for control and measuring systems, and the like. The rail-like connecting devices 11 also include conduits for gaseous and liquid media. In addition, the connecting elements 21, 22 and 23 of FIG. 12 belonging to the various systems are mounted on the rail-like connecting devices 11. The rail-like connecting devices 11 can be adapted to meet the widely varying requirements in respect of electrical power, communications, monitoring, measuring and control systems. Electrical lines and conduits are laid in a suitable number and selection in the interior of the rail-like connecting devices 11 and are taken by way of the carrier elements thereof to the installation means which are laid in the building. The gaseous and liquid media are introduced into the rail-like connecting devices 11 within which they are conveyed, at different pressures, for example more than 2 to 4 bars, by way of suitable pipe conduits. In the rail-like connecting devices 11a, adjustable pressure reducing devices may be provided so that each user can establish a desired pressure setting at the connecting portion that he is using. The connecting devices 11 further include connecting means for the filters 29 and other devices which are to be selectively introduced into the flow of the gaseous and liquid media.

As shown in FIG. 1, mounted at least along a part of the rail-like connecting devices 11 are horizontal guides 12 on which cantilever carriages 13 are suspended and are thus displaceable as desired along the respective rail-like connecting devices 11. Items of equipment such as measuring instruments and the like may be carried on the carriages 13, which are moved to the desired location and which can be connected to portions of the connecting devices 11.

The working and standing position elements 14 can be freely set up and grouped beneath the rail-like connecting devices 11 and underneath the paths of movement of the carriages 13, in a desired pattern or plan. FIG. 1 indicates by way of a square pattern, the options in regard to setting up and grouping the elements 14. Other options are shown in FIGS. 2 to 11.

The upper part of FIG. 1 shows a "comb-like" arrangement of rail-like connecting devices 11 while the lower part of Fig . 1 shows an "angular" arrangement and a "T-shaped" arrangement of two rail-like connecting devices 11. Where the rail like connecting devices 11 are joined to each other at right angles, there is afforded a high concentration of connection portions. In addition, removal or discharge means may be fixedly installed beneath the connecting devices 11 on the floor of the laboratory, production location or the like, at locations between or at the particular working and standing position elements 14. Such discharge means are connected to a fixed removal or drainage installation in the building.

Figure 2:
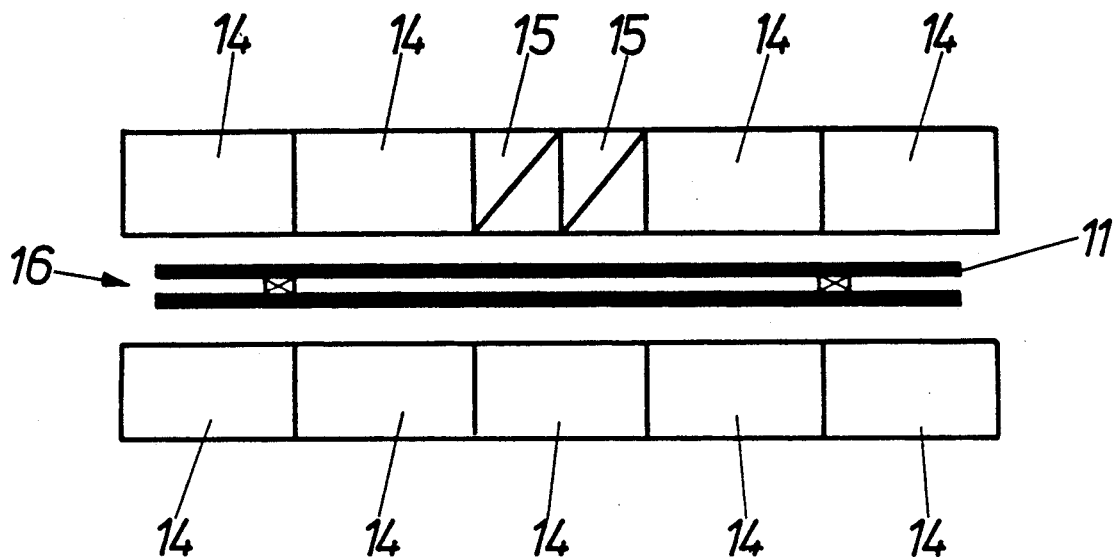
FIG. 2 illustrates a modified distribution layout, having the form of a "parallel" configuration, incorporating two rows of workbenches, and a single rail-like connecting device.

FIG. 2 shows a "parallel set-up" configuration. For that purpose, a respective row of working and standing position elements 14 is positioned along each of the two longitudinal sides of a rail-like connecting device 11, in parallel relationship thereto, in such a way that there is a passage or gangway 16 left between the two rows, beneath the rail-like connecting device 11. As the connecting device 11a is mounted at a spacing from the floor which approximately corresponds to the height of a man, it is possible to walk along the gangway 16 in order to carry out maintenance on the equipment which is set up on the elements 14 and in such a way to permit connection of those items of equipment to the connecting device 11.

As indicated in FIG. 2, removal or discharge elements 15 may be arranged between the working and standing position elements 14, for example laboratory tables or benches, which have been kept free of any supply means and removal or discharge means. The elements 15 contain suitable discharge or removal means such as liquid drainage means, gas extractor means and the like, and can be connected to installations systems which are laid in the floor of the room. The gangway 16 formed between the two rows of elements 14 may also be used at the same time a path of movement for one or more cantilever carriages which are suspended beneath the rail-like connecting device 11a and which are movable therealong. The guide for the carriage or carriages may then be mounted under the connecting device 11 on the carriers or supports 17 thereof (FIG. 12), for example hanging carriers.

Figure 3:
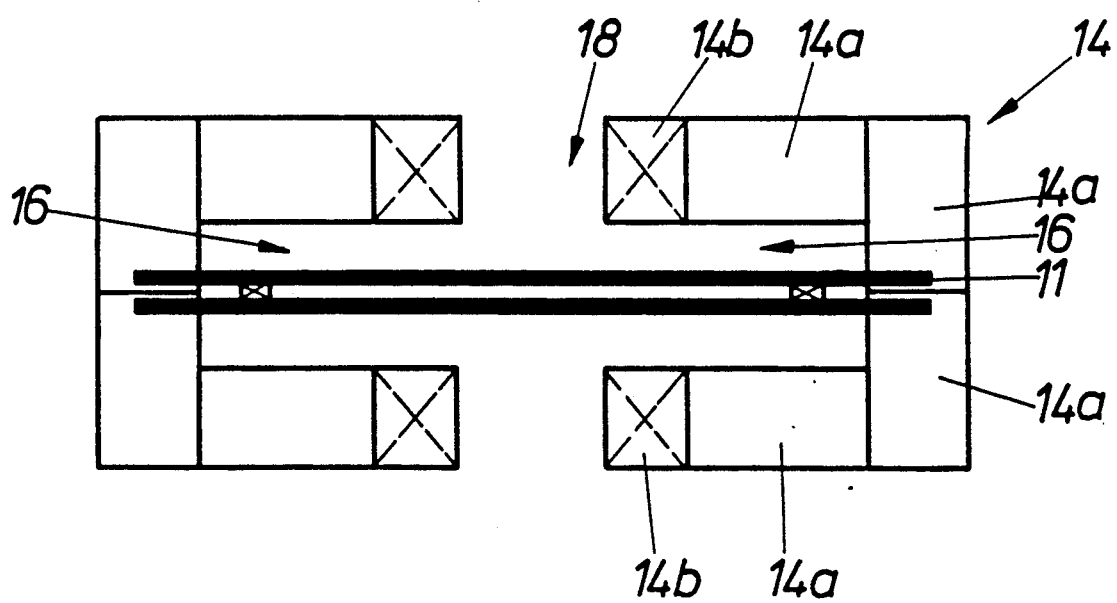
FIG. 3 illustrates a further modified distribution lay out, having workbenches arranged in two facing "U-shaped" configurations, showing one rail-like connecting device.

FIG. 3 shows another arrangement of working and standing position elements 14 in relation to a rail-like connecting device 11, more particularly a "square configuration". At each end region of the rail-like connecting device 11 is a U-shaped group of laboratory tables or benches 14a, wherein the closed portion of the group is disposed below the respective end region of the rail-like connecting device 11. Disposed at the open ends are respective working and standing position elements in the form of a stand or rack 14b for physically large analysis equipment and the like. As in the case of the embodiment shown in FIG. 2, a gangway 16 is formed by the interior of the U-shaped arrangements, beneath the rail-like connecting device 11. The gangway 16 can be used for the same purposes as in the embodiment shown in FIG. 2, and is open by way of access gangways 18 formed between the two U-shaped groups. As the connecting device 11 can be mounted at a spacing from the floor which approximately corresponds to the height of a man, a single access gangway 18 would also be sufficient. It would therefore be possible, at one side of the "square configuration" shown in FIG. 3, to provide additional removal or discharge elements 15 (FIG. 2), for example between the transversely disposed and longitudinally disposed laboratory benches 14. Under such circumstances, the stands or racks 14b could be set up closely adjacent to each other at one side.

FIG. 4 shows another arrangement of a rail-like connecting device 11 with working and standing position elements in the form of laboratory tables or benches 14a, grouped in an "island" configuration. In particular, four "islands" are formed, each consisting of two laboratory tables or benches 14a which butt against each other in a longitudinal direction. At each end region of the connecting device 11a is an island disposed in a transverse direction, while in the middle region of the connecting device 11a is an island disposed in parallel relationship to the connecting device 11a, leaving a gangway 16, beneath and at both sides of the connecting device 11a.

FIG. 5 shows a modified "island" configuration in which, instead of the gangway shown in FIG. 4, two additional laboratory benches 14a are positioned beneath the middle region of the rail-like connecting device 11.

FIG. 6 shows a further modification of an "island" configuration in which two islands are formed from six laboratory benches 14a. The islands are positioned beneath the end regions of the rail-like connecting device 11 in such a way that there is an access gangway 18 at each side of the connecting device 11. As shown in broken lines, removal elements 15 could also be arranged in the region of the access gangways 18, beneath the rail-like connecting device 11a.

FIG. 7 shows another "island"-type configuration. In this case, ten laboratory benches 14a are fitted together to form an island which extends along the connecting device 11, wherein the island directly occupies the space beneath the connecting device 11, without provision of a gangway.

Figure 8:
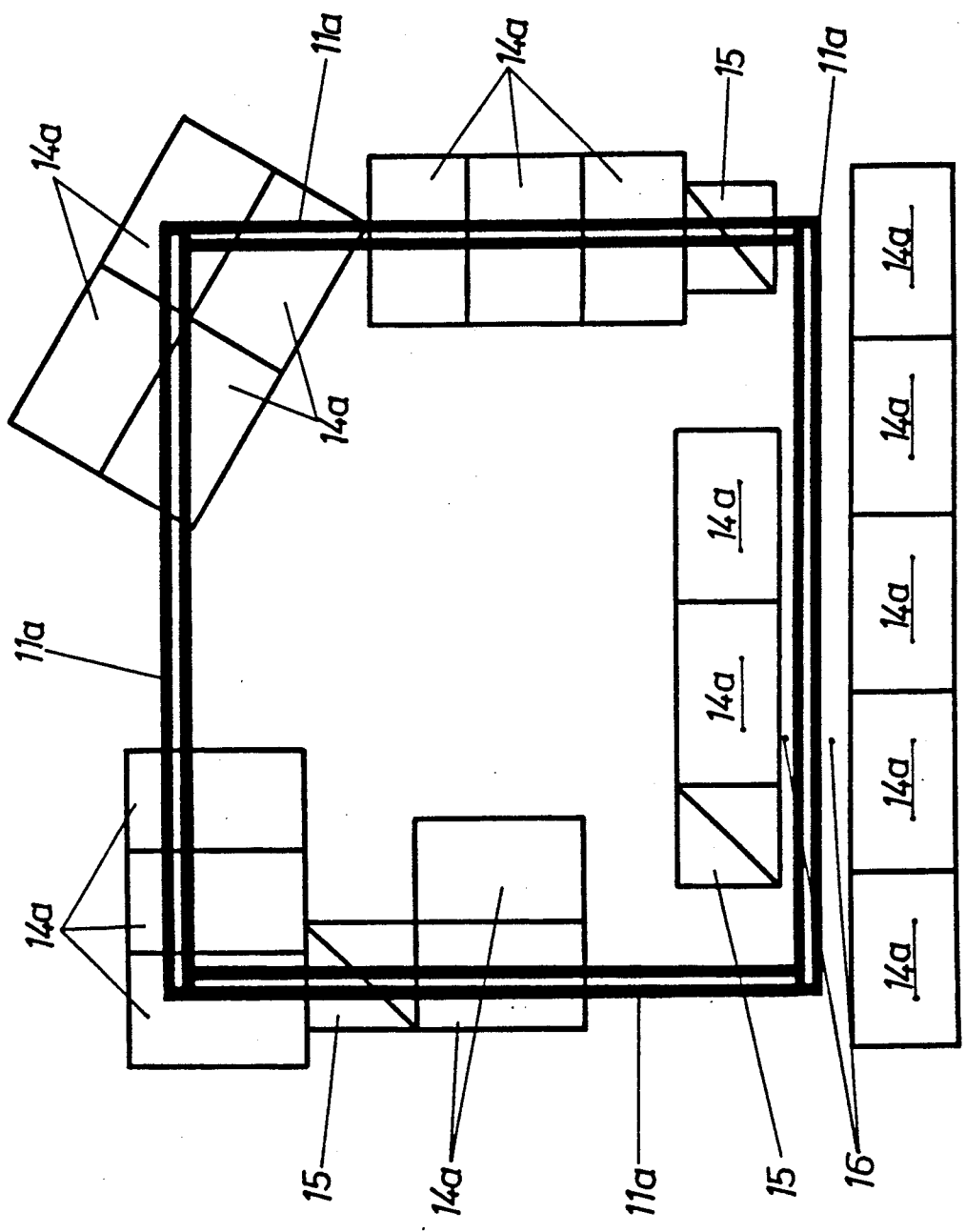
FIG. 8 illustrates an additional construction, characterized by a modified "square ring" configuration of workbenches and rail-like connecting device.

FIG. 8 shows an arrangement of four rail-like connecting devices 11a which are interconnected in the manner of a square ring and which are fixedly mounted in a working area, for example a laboratory room. Disposed beneath the four connecting devices 11a are connecting means for removal or discharge purposes, in the floor of the working area. In the case of the embodiment shown in FIG. 8, the connecting region which is defined by the square ring arrangement of connecting devices 11a and the removal connections associated therewith in the floor, are made up by four "islands" which are composed of laboratory tables or benches 14a, and, at the limb of the square ring which is at the bottom in FIG. 8, by a "parallel configuration" which is composed of laboratory tables or benches 14a, thereby forming a gangway 16. Removal elements 15 are also arranged in a row with respect to the laboratory tables or benches 14a in the parallel configuration and at the islands.

Figure 9:
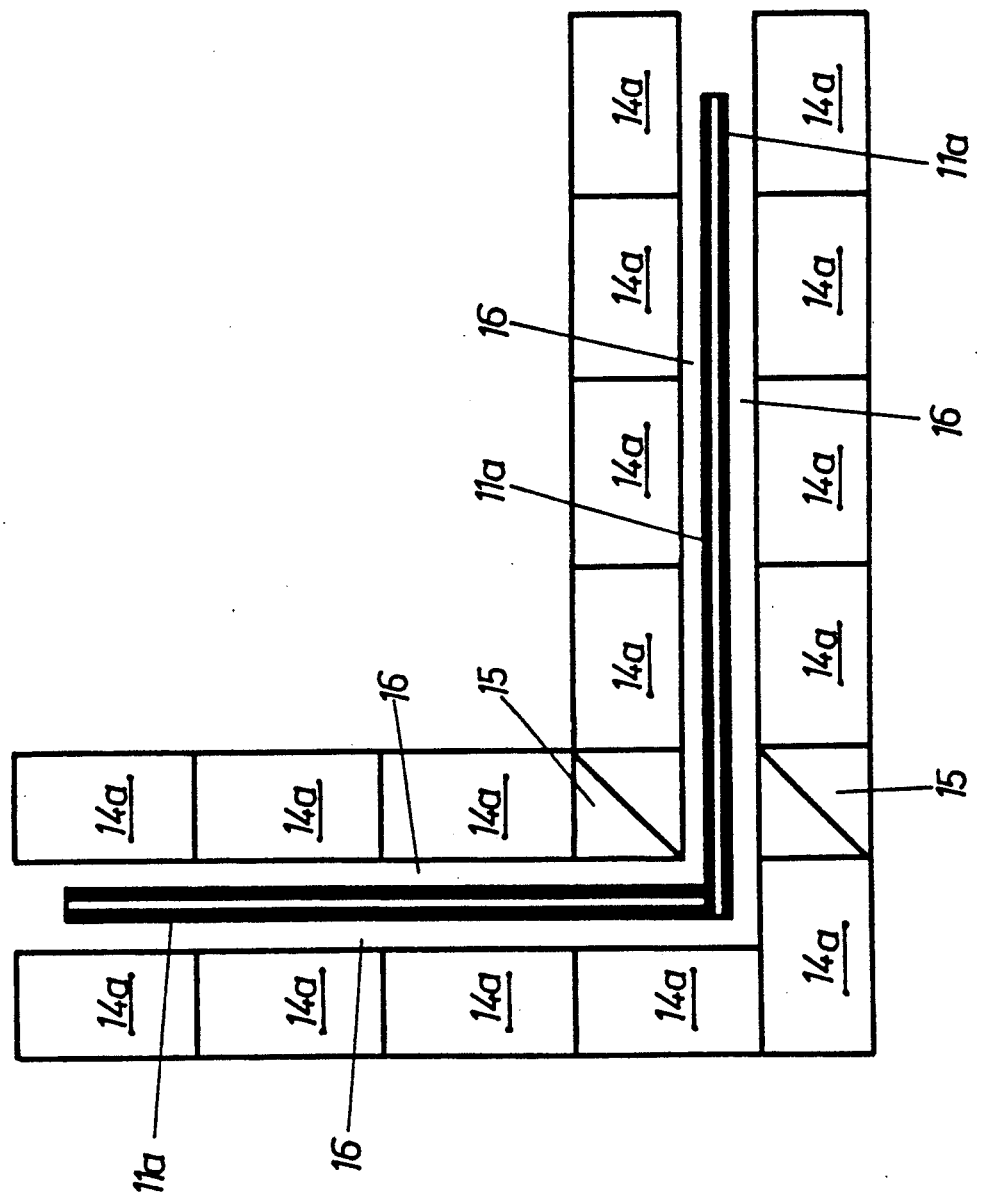
FIG. 9 shows another construction, incorporating a group of workbenches and rail-like connecting device disposed in an angular configuration.

FIG. 9 shows a layout comprising two rail-like connecting devices 11a in an angular configuration, fixedly mounted in the working area. Removal or discharge connections are installed beneath the corner region of the angular arrangement 11, in the floor of the working area. The angular arrangement of the two rail-like connecting devices 11 is made up by two parallel groups of laboratory benches or tables 14a, while additional removal or discharge elements 15 are incorporated at the corner of the connecting devices 11a.

Figure 10:
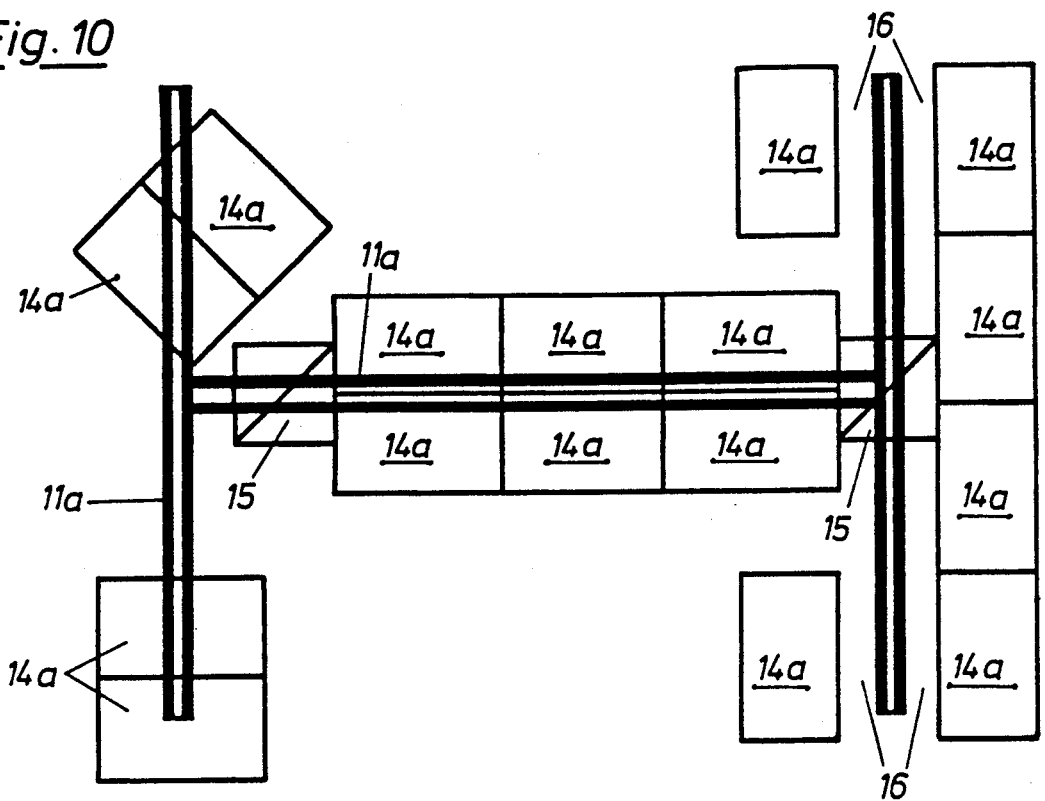
FIG. 10 illustrates a workstation incorporating workbenches and rail-like connecting devices arranged in the shape of the letter "H".
Figure 11:
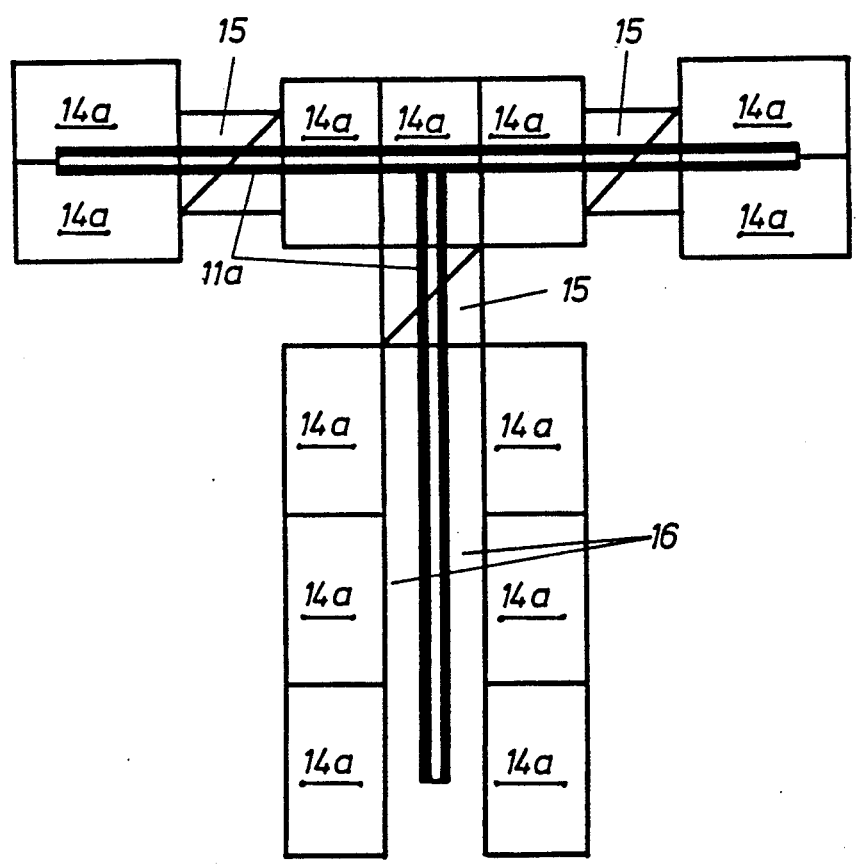
FIG. 11 shows a workstation incorporating workbenches and rail-like connecting devices arranged in the shape of the letter "T".

In FIG. 10, three rail-like connecting devices 11a are interconnected in an "H-arrangement" and are fixedly mounted in the respective working area. Removal or discharge connections are installed in the floor of the working area beneath the "H-arrangement" of connecting devices 11a, in the two regions in which the web of the "H-configuration" meets the legs thereof. Laboratory tables or benches 14a are freely set up and grouped either in parallel sets, or as "islands". Removal or discharge elements 15 are provided in the region of the junctions between the web and the legs of the "H-configuration", and are connected to removal or discharge connections disposed in the floor. In the embodiment shown in FIG. 11, two rail-like connecting devices 11a form a "T-arrangement" and are fixedly mounted substantially horizontally at a spacing from the floor which approximately corresponds to the height of a man. Removal or discharge connections are installed in the floor of the working area in the region where the two connecting devices 11a meet. "Islands" composed of laboratory tables or benches 14a are provided, as in the previous embodiments, as are discharge or removal elements 15 connected to the discharge connections in the floor. Gangways 16 are formed as indicated, beneath and adjacent to the connecting device 11a, and a cantilever carriage can be suspended beneath the connecting device 11a, being movable therealong.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

LIST OF REFERENCE NUMBERS 11 connecting device
11a rail-like connecting device
11b column-like connecting device
12 guides
13 cantilever carriage
14 working and standing position elements
14a a laboratory bench
14b rack or stand
15 removal element
16 gangway
17 carrier
18 access gangway
21 connecting element
22 electrical connecting device
23 connecting device
24 operating knobs
25 pressure indicator instrument
26 cover plate
27 items of equipment
28 working surface
29 filter
30 connecting element
31 connection
32 transverse bar member
33 electrical connecting element
34 adjusting device
35 indicator device
36 connections
37 working position lamp
38 lamp
A working plane
B floor
E removal plane
I removal means and installation connections
V supply plane

What is claimed is:

1. Equipment for forming workstations adapted for use on floor areas of laboratories, production locations, and testing and research facilities, said equipment comprising in combination:
   (a) a plurality of portable workbench elements adapted to rest on said floor areas,
   (b) a plurality of horizontally disposed connecting devices separate and apart from said workbench elements, for connection with supplies for electrical energy and devices that handle fluid media, and for use with communications and monitoring apparati,
   (c) said connecting devices being arranged and fixedly mounted in a predetermined pattern distribution within a working space over said floor areas and being disposed in a substantially horizontal plane at a predetermined vertical distance above said floor areas,
   (d) said connecting devices being elongate and comprising conduit means (11, 11a, 11b) having a determinate structural configuration and having supply devices (21, 22, 23) for said electrical energy, for said fluid media, and for said communications and monitoring apparati, said supply devices (21, 22, 23) being carried in the said conduit means (11, 11a, 11b),
   (e) said workbench elements being free to be placed on the said floor areas below the said connecting devices in any desired disposition and configuration, and in any desired position with respect to each other and with respect to the said connecting devices, thereby to form a work facility which is adaptable to various respective laboratory, production, test or research tasks, and
   (f) support means extending upwardly from said connecting devices, for suspending the latter from the ceiling of the facility in which the workstations are located.

2. Equipment for forming workstations adapted for use on floor areas of laboratories, production locations, and testing and research facilities, said equipment comprising in combination:
   (a) a plurality of portable workbench elements adapted to rest on said floor areas, and
   (b) a plurality of horizontally disposed connecting devices separate and apart from said workbench elements, for connection with supplies for electrical energy and devices that handle fluid media, and for use with communications and monitoring apparati,
   (c) said connecting devices being arranged and fixedly mounted in a predetermined pattern distribution within a working space over said floor areas and being disposed in a substantially horizontal plane at a predetermined vertical distance above said floor areas,
   (d) said connecting devices being elongate and comprising conduit means (11, 11a, 11b) having a determinate structural configuration and having supply devices (21, 22, 23) for said electrical energy, for said fluid media, and for said communications and monitoring apparati, said supply devices (21, 22, 23) being carried in the said conduit means (11, 11a, 11b),
   (e) said workbench elements being free to be placed on the said floor areas below the said connecting devices in any desired disposition and configuration, and in any desired position with respect to each other and with respect to the said connecting devices, thereby to form a work facility which is adaptable to various respective laboratory, production, test or research tasks,
   (f) said conduit means (11, 11a, 11b) including substantially horizontally extending guides (12) under which the workbench elements (14) can be arranged.

3. The invention as set forth in claim 1, and further including:
   (a) carriages (13) which are displaceable along the said guides (12).

4. The invention as set forth in claim 1, and further including:
   (a) carriages (13) which are horizontally displaceable along said guides (12),
   (b) said guides (12) being aligned in substantially parallel relationship to the said conduit means (11, 11a, 11b).

* * * * *